May 14, 1929.  B. G. GOBLE  1,712,730

PUMPING JACK CHAIN

Filed Feb. 24, 1927

INVENTOR

Patented May 14, 1929.

1,712,730

UNITED STATES PATENT OFFICE.

BERT G. GOBLE, OF TULSA, OKLAHOMA.

PUMPING-JACK CHAIN.

Application filed February 24, 1927. Serial No. 170,573.

This invention relates to an improved chain to be principally used in connection with a pumping jack to pump oil wells, or the chain can be used on any circular surface without sprockets.

One important feature of my invention is the compact arrangement of the several links whereby not only is exceptional strength and rigidity obtained but the life of the moving parts are materially increased due to their extra size and good lubrication.

Lubrication is accomplished by means of reservoirs, ducts leading therefrom to the sides of the journals. This system furnishes the oil at the sliding surfaces which are binding most due to the longitudinal pull on the chain and thus lubrication occurs slowly at the point where it is most needed.

Another object of this invention is to provide a chain that can easily be taken apart and parts replaced, or taken apart and thoroughly cleaned, as in the field tools are not at hand to do such work. This chain is held together by one bolt and one cotter pin to each pair of side links.

Still a further object of this invention is to provide a chain with an easy way of holding it together, and not take up any extra width in doing so, the links being recessed to accommodate the head and the cotter pin end of the bolt, and yet remain within the limits of the width of the other part of the chain.

Another object of this invention is to provide a chain that can be cast or molded and used in the rough without any machine work.

Another important object of this invention is to make a chain with as few parts as possible, and by doing so increase the tensile strength, and lessen the cost, and breakage.
The regular heavy cotter pin chains take twelve pieces to complete one link, whereas in my chain it only takes five pieces to complete one link.

With the above and numerous other objects in view, as will appear as the description proceeds, the invention resides in certain novel features of construction and in the combination and arrangement of parts as will be hereafter more fully described and claimed.

Figure 1:
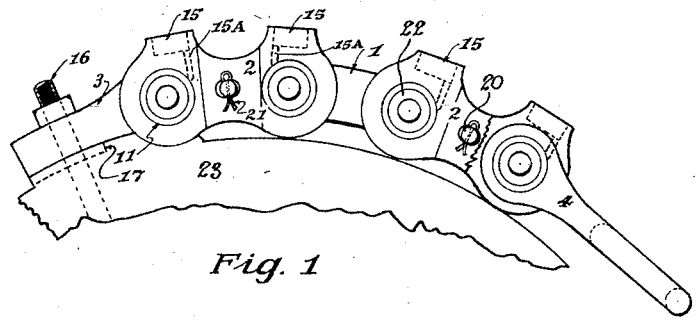
Fig. 1 is a side view of my chain in its usual working position.
Figure 2:
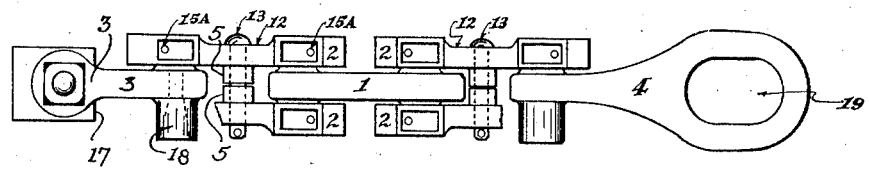
Fig. 2 is a top view of Fig. 1 with the shackle line link slightly raised and parts of the side links 2 being broken away.

Referring now in detail to my improvement, it will be seen that the numeral 1 is a flat piece of steel rounded at each end and hollow journals are cast integral on each side of each end thereby forming a double T, and by making the shaft large and hollow we get more strength for the amount of steel used, and a still greater advantage is the big wearing surface we get compared to the ordinary style of chain. This double T-shaped member or connecting link 1, has side pieces 2 pivotally mounted on its journals, 22, and said side pieces have inwardly protruding pads or bosses 5 rigid therewith and located near the central portion of these side pieces. A hole is formed through these bosses in which a bolt 20, is held by means of a cotter pin 21 inserted in a small hole 14 near the end of the bolt as shown in Fig. 1.

Figure 3:
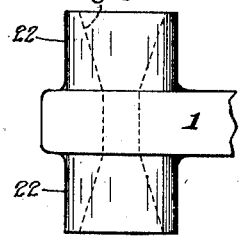
Fig. 3 is an enlarged view of one end of the connecting link showing its hollow construction.
Figure 6:
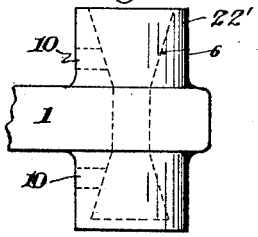
Fig. 6 is an enlarged view of a modification of the hollow connecting links.

The journals, 22, are hollow, having a hole 6 therein, as shown in Fig. 3, and links 2 have oil reservoirs 15, with ducts 15$^A$ leading to the sides of the journals as shown in Fig. 1. The oil hole 15$^A$ from the oil reservoir 15 is placed on the side of the bearing so that it will always be tight and serves as a valve to keep the oil from running into the bearing.

Links 2 are reversible and are widened out at each end thereby obtaining a large bearing surface and they are thinned down at their central portion 12 in order to maintain an economical uniform cross section, as well as providing a recess for heads 13 of the bolts 20.

Holes 11 are formed near each end.

Figure 4:
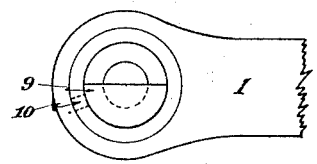
Fig. 4 is an enlarged side view of the connecting link shown in Fig. 6 disclosing the end closure plate whereby the oil may be retained in the chain when it is used in an inverted position.
Figure 5:
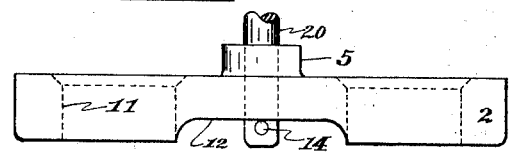
Fig. 5 is an enlarged view of one of the side pieces of the chain, the oil reservoirs being omitted.

As shown in Fig. 4, a semi-circular plate 9 is tightly inserted in the open end of the hollow cup journal 22 thereby retaining the oil when the chain is used in an inverted position to that shown in Fig. 1. Oil ducts 10 lead from the cup reservoir to the sliding parts.

A rocker clamp 3 is pivoted between the two end connecting links 2, and is held to the pulled member 23 by means of bolt 16, said clamp abutting against a shoulder 17 whereby shearing of the bolt is averted.

A line link 4 having a hole 19 therein is pivotally fastened to the other end of the chain, thereby serving as the pulling element.

In order to assemble this chain all there is to do is place journals 22 into the holes in side pieces 2 which fit loosely and put bolt 20 through center holes, and fasten by means of a cotter pin 21.

It will be apparent that I have provided simple means of getting a chain with more tensile strength in same width and more wearing surface than is possible to get in a chain that is designed for a sprocket wheel. My chain is practical, strong, easy to make, such being attained by cutting out all the refinements necessary for a sprocket wheel chain.

The present embodiment of my invention has been disclosed merely by way of example, since in actual practice it will be apparent that numerous changes in details of construction and in combination and arrangements of parts may be resorted to without departing from the spirit or scope of this invention hereinafter claimed, or sacrificing any of its advantages.

Having thus described my invention, what I claim as new and novel is:

1. A chain comprising inner links and side pieces, each of the inner links having integral journals at its ends upon which the side pieces are loosely mounted and means pivotally connecting the side pieces at their central portions.

2. A chain comprising inner links and side pieces each of the inner links having protruding hollow journals at its ends upon which the side pieces are loosely mounted, said side pieces having inwardly projecting abutting bosses and means pivotally connecting the side pieces near their central portion.

3. A chain comprising inner links and side pieces each of the inner links having protruding hollow journals at its ends upon which the side pieces are loosely mounted, said side pieces having inwardly projecting abutting bosses near their central portion and a reservoir at each end thereof, and a hole extending from each of said reservoirs to one side of said hollow journals, and means connecting the side pieces at their central portion.

4. A chain consisting of a series of units, each unit being comprised of an inner link and two side pieces, said inner link having two oppositely extending journals at each end, said side pieces having holes near each end and a hole surrounded by a boss at its central portion, said side pieces being mounted upon one set of journals whereby the bosses abut each other thus forming a spacing means and other means extending through the central hole in the side pieces to hold the same together.

5. A chain comprising a series of units each unit consisting of a double T-shaped inner link, two side pieces pivoted on one end of the inner link and means located centrally of the side pieces to hold the same together.

In testimony whereof I affix my signature.

BERT G. GOBLE.